United States Patent [19]

Sano et al.

[11] Patent Number: 4,508,152

[45] Date of Patent: Apr. 2, 1985

[54] PNEUMATIC RADIAL TIRES HAVING AN IMPROVED BEAD PORTION DURABILITY

[75] Inventors: Shigehisa Sano, Akigawa; Isao Seto, Kodaira; Hiroyuki Koseki, Ohmiya; Mana Minomura, Mitaka, all of Japan

[73] Assignee: Bridgestone Tire Company Limited, Tokyo, Japan

[21] Appl. No.: 571,881

[22] Filed: Jan. 18, 1984

[30] Foreign Application Priority Data

May 24, 1983 [JP] Japan .................................. 58-90060

[51] Int. Cl.³ .......................... B60C 15/00; B60C 9/02
[52] U.S. Cl. .................................. 152/356 R; 57/902; 152/359; 152/362 R
[58] Field of Search ......... 152/362 R, 362 CS, 354 R, 152/356 R, 357 R, 359, 361 R, 354 RB, 330 R; 57/902, 212, 213

[56] References Cited

U.S. PATENT DOCUMENTS

| 3,111,976 | 11/1963 | Delobelle | 152/362 R |
| 3,557,860 | 1/1971 | Maiocchi | 152/362 R |
| 4,158,946 | 6/1979 | Bourgois | 57/213 |
| 4,332,131 | 6/1982 | Palsky et al. | 57/213 |

Primary Examiner—William A. Powell
Assistant Examiner—Thomas Bokan
Attorney, Agent, or Firm—Sughrue, Mion, Zinn, Macpeak and Seas

[57] ABSTRACT

Disclosed herein is a pneumatic radial tire having an improved bead portion durability, which comprises a main tire body reinforcement of a radial carcass ply and a bead portion reinforcement of a metal cord layer arranged along the turnup portion of the carcass ply wound around the bead core of the bead portion from the inside to the outside. In the tire of this type, the bead portion reinforcement is composed of a support reinforcing layer and a turnup-end protecting layer independently arranged on the inside and outside of the bead core, and the turnup-end protecting layer has a modulus of elasticity at 1% elongation in cord direction smaller than that of the support reinforcing layer.

5 Claims, 9 Drawing Figures

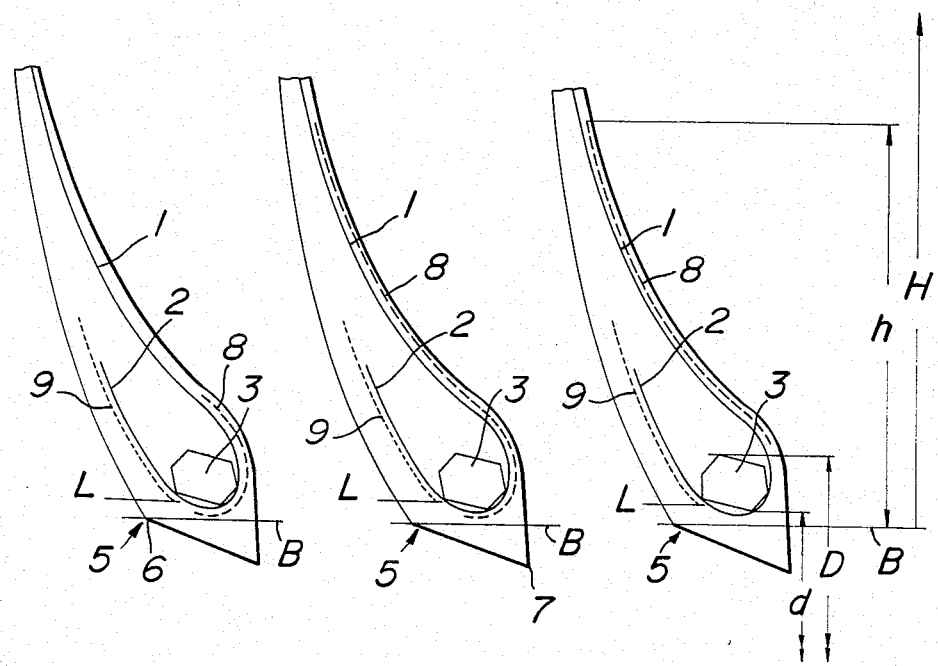

PNEUMATIC RADIAL TIRES HAVING AN IMPROVED BEAD PORTION DURABILITY

BACKGROUND OF THE INVENTION (1) Field of the Invention

This invention relates to pneumatic radial tires, and more particularly to a novel bead portion-reinforcing structure directed at the improvement of the durability in bead portions of heavy duty pneumatic radial tires.

(2) Description of the Prior Art

In general, the heavy duty pneumatic radial tire comprises a main tire body reinforcement comprising a carcass composed of at least one ply containing metal cords arranged in the radial direction, a tread reinforcement comprising a belt composed mainly of at least two layers of metal cords superimposed about a crown portion of the carcass, the cords of which being crossed with each other at a small inclination angle with respect to the equatorial plane of the tire, and a bead portion reinforcement comprising a layer of metal cords obliquely arranged along that turnup portion of the carcass ply which is wound around a bead core in each of the bead portions from the inside to the outside with respect to the cords of the carcass turnup portion.

FIGS. 1a to 1c and FIGS. 2a to 2c illustrate conventional bead portion reinforcements, respectively, in which numeral 1 is a carcass ply, numeral 2 a turnup portion of the carcass ply, numeral 3 a bead core, numeral 4 a bead portion-reinforcing layer and numeral 5 a bead portion. FIGS. 1a to 1c each illustrate the case where the outer end of the bead portion-reinforcing layer 4 extends over the turnup portion 2, while FIGS. 2a to 2c each illustrate the case that the outer end of the bead portion-reinforcing layer 4 extends up to a position lower than the upper end of the turnup portion 2. On the other hand, the inner end of the bead portion reinforcing layer 4 is terminated at a position near a bead heel 6 in case of FIGS. 1a and 2a and at a position near a bead toe 7 in case of FIGS. 1b and 2b and is wound around the bead core 3 from the outside toward the inside in case of FIGS. 1c and 2c.

In any case, these bead portion reinforcements are designed to prevent the occurrence of separation failure at the end of the carcass turnup portion by restraining the outward deformation of the bead portion during running of the tire (i.e., enhancing the resistance to the deformation of the bead portion toward the rim flange under a load applied to the tire) and restraining the permanent strain of the bead core. However, any of the conventional bead portion reinforcements as shown in FIGS. 1a to 1c and FIGS. 2a to 2c have a limit to improve the durability of the bead portions.

That is, in order to restrain the outward deformation of the bead portion and the permanent strain of the bead core, it is preferable to increase the rigidity of the reinforcing layer and turn up the reinforcing layer around the bead core toward the inside of the tire (FIGS. 1c and 2c). But, with respect to the structure of FIG. 1 in which the outer end of the reinforcing layer 4 extends over the upper end of the carcass turnup portion 2, when the rigidity of the reinforcing layer is increased, the strain at the outer end of the reinforcing layer becomes larger than that at the upper end of the carcass turnup portion, so that the separation is unfavorably caused at the outer end of the reinforcing layer. Therefore, in the structure of FIG. 1, it is necessary to employ a reinforcing layer having a small rigidity, which accordingly imposes a limit on the improvement in the durability of the bead portion.

On the other hand, with respect to the structure of FIG. 2 in which the outer end of the reinforcing layer extends up to a position lower than the upper end of the carcass turnup portion, it is insufficient for the protection against the upper end of the carcass turnup portion although the durability of the bead portion is improved to a certain extent by the increase of the rigidity of the reinforcing layer and the turn-up structure of the reinforcing layer around the bead core (FIG. 2c), which has also a limit on the improvement in the durability of the bead portion.

Under the above circumstances, a demand exists for a more advantageous bead portion reinforcement which can simultaneously achieve the increase of the resistance to the outward deformation of the bead portion and the restraint of the permanent strain of the bead core and also can improve durability against separation failure at not only the upper end of the carcass turnup portion but also the outer end of the reinforcing layer.

SUMMARY OF THE INVENTION

It is, therefore, an object of the invention to advantageously and easily solve the aforementioned drawbacks of the prior art on the bead portion reinforcement by taking a drastic measure based on a novel technical idea that the bead portion-reinforcing layer is divided into two members located on the inside and outside of the bead core.

According to the invention, a pneumatic radial tire has an improved bead portion durability, which comprises a main tire body reinforcement comprising a carcass of at least one ply containing metal cords arranged in the radial direction of the tire, and a bead portion reinforcement comprising a layer of metal cords obliquely arranged along the turnup portion of said carcass which is wound around a bead core in each of the bead portions from the inside to the outside with respect to the cords of said turnup portion, characterized in that said bead portion reinforcement is composed of a support reinforcing layer and a turnup-end protecting layer separately arranged on the inside and outside of the bead core respectively, and said turnup-end protecting layer has a modulus of elasticity at 1% elongation in cord direction smaller than that of said support reinforcing layer and is disposed over an area extending from an intermediate level between the inner and outer diameters of said bead core to a level higher than the upper end of said turnup portion.

In the preferred embodiment of the invention, the modulus of elasticity at 1% elongation in cord direction of the support reinforcing layer is 0.5–1.5 times that of the carcass ply, while the modulus of elasticity at 1% elongation in the cord direction of the turnup-end protecting layer is 0.1 to 0.5 times that of the carcass ply. Further, the support reinforcing layer is disposed to turn around and surround the inner circumferential portion of the bead core.

According to the invention, the resistance to separation failure at the bead portion of the heavy duty pneumatic radial tire can advantageously be improved by separately arranging the support reinforcing layer, which advantageously serves together with the carcass to cope with the outward deformation of the bead portion and the permanent strain of the bead core under the loading deformation of the tire, and the turnup-end protecting layer, which contributes to the prevention of the separation failure at the upper end of the carcass turnup portion, as the bead portion reinforcement and further by optimizing the physical properties of the support reinforcing layer and the turnup-end protecting layer to be well suited for their functional roles, respectively.

BRIEF DESCRIPTION OF THE DRAWINGS

The invention will be described in greater detail with reference to the accompanying drawings, wherein:

FIGS. 3-5 are partial sectional views illustrating embodiments of the bead portion in the radial tire according to the invention.

DESCRIPTION OF THE PREFERRED EMBODIMENTS

Figures 1A, 1B, 1C:
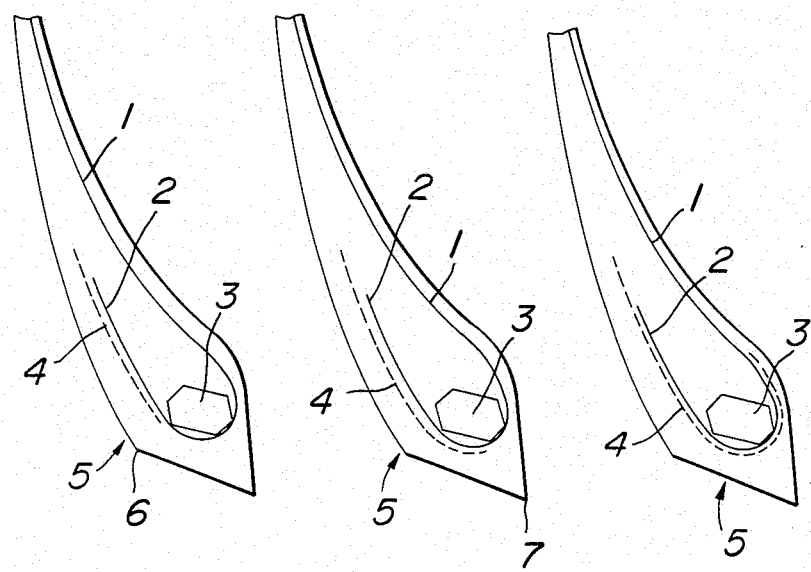
FIGS. 1a to 1c and FIGS. 2a to 2c are partial sectional views illustrating several embodiments of the bead portion in the conventional radial tire as mentioned above.
Figures 2A, 2B, 2C:
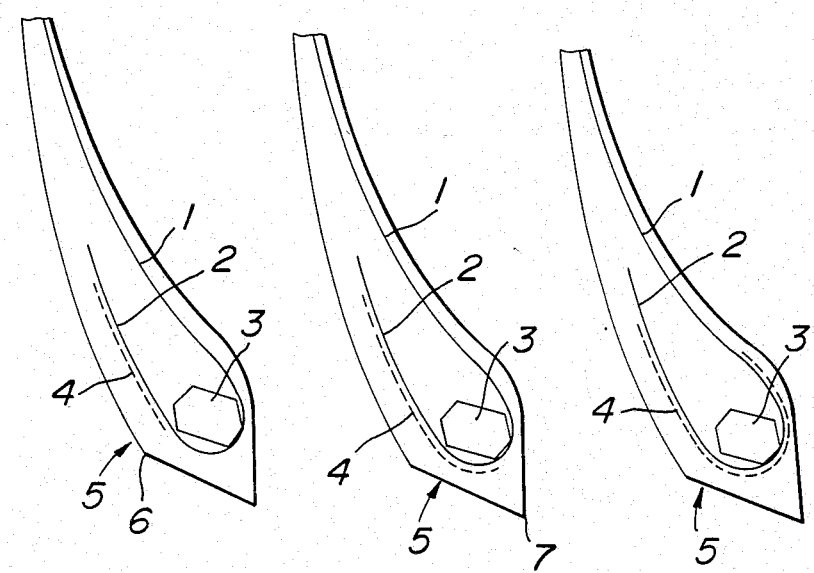

FIGS. 3 and 4 illustrate preferred embodiments of the radial tire according to the invention, and FIG. 5 shows a modified embodiment of the radial tire according to the invention. In this case, the same reference numerals in FIGS. 1 and 2 are given to the corresponding parts in FIGS. 3 to 5. As seen from these figures, the first feature of the invention lies in that a support reinforcing layer 8 and a turnup-end protective layer 9 are independently arranged as a bead portion reinforcement.

According to the invention, the support reinforcing layer 8 is arranged along the inner surface of the carcass ply 1 to extend up to a height h being not more than 40% of the maximum height H of the carcass line as measured from a bead base line B (that is, a straight line parallel to the rotational axis of the tire at an intersection of the inner circumferential surface of the bead portion 5 with the outer surface of the tire). Further, the support reinforcing layer 8 is required to have a modulus of elasticity higher than that of the turnup-end protecting layer 9 for the purpose of preventing the outward deformation of the bead portion 5 under a load applied to the tire and restraining the permanent strain of the bead core 3 or the slippage of the bead core from its original position in the bead portion to thereby improve resistance to separation failure.

The modulus of elasticity discussed herein is compared on the basis of the strain per a unit width of 1 mm in cord direction at 1% elongation with respect to the supporting reinforcing layer, turnup-end protecting layer and the carcass ply. According to the invention, the supporting reinforcing layer 8 is preferable to have a modulus of elasticity being 0.5-1.5 times that of the carcass ply. If the height h of the layer 8 is too high, the strain at the upper end of the layer 8 increases excessively though the modulus of elasticity is set within the above range. Thus, the height h should be limited to not more than 40% of the carcass height H.

Further, it is preferred that the support protecting layer 8 encloses the turnup portion of the carcass ply around the bead core 3 at an area as wide as possible for the purpose of reducing the permanent strain of the bead core in the bead portion 5. As shown in FIGS. 3 and 4, it is preferable that the support reinforcing layer 8 is arranged to turn around and surround the inner circumferential surface of the bead core 3 through the carcass ply 1.

On the other hand, the turnup-end protecting layer 9 has a modulus of elasticity smaller than that of the supporting reinforcing layer 8, and is disposed over an area extending from a position substantially coincident with the inner diameter d of the bead core 3 or an intermediate level L between the inner diameter d and the outer diameter D of the bead core 3 to a level higher than the upper end of the turnup portion 2 of the carcass ply 1 as shown in FIGS. 3 to 5. In the turnup-end protecting layer 9, the modulus of elasticity is 0.1-0.5 times that of the carcass ply. If the height of the turnup-end protecting layer 9 becomes too high, it may cause the rubber rupture at the upper end thereof likewise the case with the too high modulus of elasticity. Conversely, if the modulus of elasticity of the layer 9 is too small, the resistance to separation failure lowers.

In the illustrated embodiments, since the lower end of the turnup-end protecting layer 9 terminated at a position corresponding to the bead heel 6 as shown by level "L" may be a starting point to cause cracks due to the thrusting-up action of the rim, such a lower end must not be at a too high position, while if it is located just beneath the bead core, the movement of the turnup-end protecting layer 9 is undesirably restrained under a strong pressure between the rim and the bead core, resulting in the same result as in the case with the too high modulus of elasticity.

The metal cords employed in both the support reinforcing layer 8 and the turnup-end protective layer 9 are obliquely arranged with respect to the metal cord of the carcass ply 1 or its turnup portion 2. The oblique angle of the metal cords in the layers 8 and 9 is preferable to be within a range of 45°-70°, which is defined by an angle formed between the tire radial plane and the metal cord as measured on the circumference depicted by the upper end of the metal cord.

The bead portion reinforcement as shown in FIGS. 3-5 was applied to a test tire having a tire size of 11 R 22.5 14 PR which was in turn assembled into a normal rim having a size of 8.25×22.5. Then, various tests were made with respect to the tire-rim assembly to obtain a result as shown in the following table together with test results using the conventional bead portion reinforcements shown in FIGS. 1a to 1c and FIGS. 2a to 2c. The dimensions of the carcass ply 1, the supporting reinforcing layer 8 and the terminal protecting layer 9 used in the test tire according to the invention are as follows:

Carcass Ply:

Steel cords with a strand structure $(1\times3+9+15)\times0.175$ mm$\phi$+1$\times$0.15 mm$\phi$ were arranged at an end count of 28 cords/50 mm, and their modulus of elasticity at 1% elongation in cord direction was 54.4 kg/mm in width.

Supporting Reinforcing Layer:

Steel cords with a strand structure of $(1\times3+9+15+1)\times0.15$ mm$\phi$ were arranged at an end count of 26 cords/50 mm, and their modulus of elasticity at 1% elongation in cord direction was 37.4 kg/mm in width.

Turnup-end Protecting Layer:

Steel cords with a strand structure of $(1\times3+9+15+1)\times0.15$ mm$\phi$ were arranged at an end count of 13 cords/50 mm, and their modulus of elasticity at 1% elongation in cord direction was 18.7 kg/mm in width.

Thus, the moduli of elasticity in the support reinforcing layer and the turnup-end protecting layer were 0.69 times and 0.34 times that of the carcass ply, respectively.

In the bead portion reinforcement 4 in FIGS. 1 and 2, steel cords with a strand structure of $(1\times3+9+15+1)\times0.15$ mm$\phi$ were used at an end count of 26 cords/50 mm, and their modulus of elasticity was 37.4 kg/mm in width.

| Type of reinforcement | | Shearing at strain upper end of carcass turnup portion | Shearing strain at upper end of turnup-end protecting layer | Permanent strain ratio of bead core* | Durabiltiy of resistance to separation in bead portion** |
|---|---|---|---|---|---|
| FIG. 1 | a | 100 | 121 | 100 | 100 |
|  | b | 98 | 132 | 90 | 30 |
|  | c | 90 | 145 | 20 | 50 |
| FIG. 2 | a | 130 | 95 | 100 | 35 |
|  | b | 126 | 93 | 90 | 50 |
|  | c | 110 | 88 | 20 | 150 |
| FIG. 3 |  | 92 | 95 | 20 | 230 |
| FIG. 4 |  | 85 | 90 | 15 | 280 |
| FIG. 5 |  | 88 | 93 | 30 | 230 |

*Slippage ratio in dimension of bead core after the running on a drum over a distance of 10,000 km
**Measured by an indoor drum test According to the invention, the resistance to separation failure in the bead portion can largely be enhanced by independently arranging the support reinforcing layer and the turnup-end protecting layer in compliance with their respective functional roles as a bead portion reinforcement and giving the difference of the necessary physical properties to be adapted therefor, whereby the renewal life as the recapping base tire particularly required for the heavy duty pneumatic radial tire can be prolonged considerably.

What is claimed is:

1. A pneumatic radial tire having an improved bead portion durability, which comprises a main tire body reinforcement comprising a carcass of at least one ply containing metal cords arranged in the radial direction of the tire, and a bead portion reinforcement comprising a layer of metal cords obliquely arranged along the turnup portion of said carcass which is wound around a bead core in each of the bead portions from the inside to the outside with respect to the cords of said turnup portion, characterized in that said bead portion reinforcement is composed of a support reinforcing layer and a turnup-end protecting layer independently arranged on the lateral inside and lateral outside of the bead core respectively, and said turnup-end protecting layer has a modulus of elasticity at 1% elongation in cord direction smaller than that of said support reinforcing layer and is disposed over an area extending from an intermediate level between the radial inner and radial outer diameters of said bead core to a level radially outward of the upper end of said turnup portion.

2. A pneumatic radial tire according to claim 1, wherein the modulus of elasticity at 1% elongation in cord direction of said support reinforcing layer is 0.5-1.5 times that of the carcass ply and the modulus of elasticity at 1% elongation in cord direction of said turnup-end protective layer is 0.1-0.5 times that of the carcass ply.

3. A pneumatic radial tire according to claim 1, wherein said support reinforcing layer is disposed so as to turn around and surround the radially inner circumferential portion of the bead core.

4. A pneumatic radial tire according to claim 1, wherein said support reinforcing layer has a height being not more than 40% of the maximum height of the carcass line as measured from a bead base line.

5. A pneumatic radial tire according to claim 1, wherein metal cords of both the support reinforcing layer and the turnup-end protecting layer have an oblique angle of 45°-70° with respect to the metal cords of said carcass ply.

\* \* \* \* \*